UNITED STATES PATENT OFFICE.

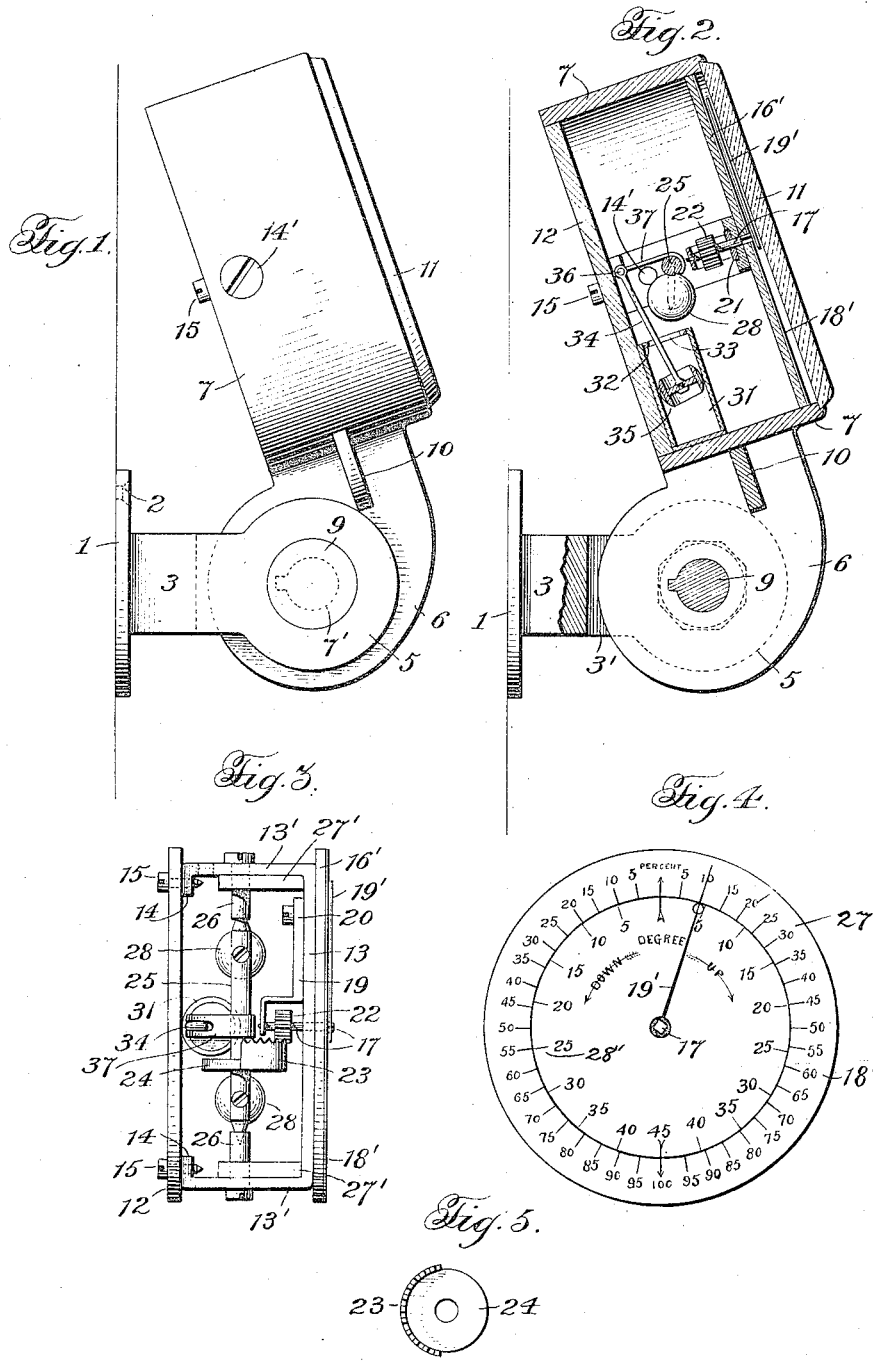

RUTHERFORD B. POTTER, OF BRIGHTON, COLORADO.

GRADE-INDICATOR FOR AUTOMOBILES.

1,232,394.

Specification of Letters Patent.   Patented July 3, 1917.

Application filed February 21, 1916. Serial No. 79,712.

*To all whom it may concern:*

Be it known that I, RUTHERFORD B. POTTER, citizen of the United States, residing at Brighton, in the county of Adams and State of Colorado, have invented certain new and useful Improvements in Grade-Indicators for Automobiles, of which the following is a specification, reference being had therein to the accompanying drawing.

The invention relates to improvements in a gradometer for use on automobiles, aeroplanes and the like for indicating the inclination or grade of the vehicle with reference to a horizontal line.

The object of the invention is to provide an indicator of the gravity type, that is compact in construction and applicable where the same is visible to the operator, yet simple in operation and requiring the use of but a limited number of parts, which are coupled together so that these parts cannot be affected by the ordinary jars and shocks to which the vehicle is subjected. The device is particularly adapted for use on an automobile for indicating the dips or grades of the road over which the automobile is traveling, and to this end the invention consists in the provision of a construction in which a pointer is movable over the indicator dial that has the graduating marks thereon by mechanism which is housed within the casing, and consists of a shaft mounting in bearings that are adjustable to take up the wear of the shaft, and the provision of a driving connection between the shaft and the pointer movable over the dial. When the vehicle is in a level position the pointer indicates a neutral, or zero position on the dial, while if the machine is tilted the weighted shaft will be rotated due to gravity and the pointer will travel over the dial to indicate the rise or fall of the vehicle.

The invention also comprehends the use of a retarding means having a positive and direct connection with the weighted operating shaft for giving the pointer a gradual and steady movement, eliminating any slight fluctuations thereof due to the vibration of the machine as well as when the same encounters small obstacles along the roadway, the retarding means necessarily prolonging the life of the device and preventing the several parts from being thrown out of operative relation with respect to each other. With regard to structure, the retarding means consists of a vertically arranged dash-pot, carried by the rear portion of the casing, and having an apertured cap arranged at its upper end. The dash-pot receives a suitable amount of fluid and also has arranged therein a piston which is mounted for reciprocation, and provided with relatively small channels passing through its periphery to permit the movement of the piston within the dash-pot. The piston is connected to the usual piston rod, passing through the apertured cap inclosing the dash-pot and is positively connected to the shaft by a suitable arm, whereby all relative movement of the shaft and friction between these parts is entirely eliminated.

In carrying out my invention I also utilize an indicating dial that is graduated in two independent scales extending circumferentially therearound, one scale designating the rise and fall of the vehicle in feet, while the other scale indicates the rise and fall by degrees. This form of dial has been found to have much merit, in that it is apparent that a dial of this character can be easily read and clearly understood by anyone, whereas if only a degree indication were on the dial the same would be confusing to the operator at various times.

Reference is to be had to the accompanying drawings to obtain a clear understanding of the invention.

Referring now more particularly to the drawings wherein like numerals indicate corresponding parts, the numeral 1 designates a flat relatively round supporting base, provided with apertures 2, passing therethrough for the reception of attaching members so that the base may be secured to the body of the vehicle. Rigidly secured to the base and extending therefrom is a supporting web 3, having a slot 3' therein at one end to provide spaced wings 5, which are enlarged at their outer ends and receive between them a tongue 6 projecting from the indicator casing 7. This tongue is positioned within the slot 3' and has passing therethrough an aperture registering with the apertures 7' within the upstanding wings 5, through which a clamping nut 9 is placed, it being obvious that by this means the position of the casing may be varied and retained in its various positions by the clamping nut 9. The tongue 6 projects downwardly a slight distance from the casing and thence curves inwardly where it is slightly enlarged to provide an attachment in which the casing is positioned a relatively short distance in advance of the support. The tongue at its upper end has rigidly attached thereto on each side segmental bracing members 10, upon which the casing rests. These bracing members are to rigidly support the casing and prevent the same from becoming loose which otherwise would be very apt to happen upon vibrations of the vehicle.

The forward portion of the casing is inclosed by an ordinary crystal or glass plate 11 fitted within a groove in the casing, while the rear portion of the casing 12 carrying the indicating mechanism is detachable therefrom and has attached to each side a substantially U-shape connecting member provided with oppositely disposed flanges 14 at its free ends through which the attaching screws 15 pass to afford a means for securing the connecting member to the rear portion of the casing. The connecting member has the spaced parallel bars 13', and the relatively long longitudinally extending portion 13. The parallel portions of the connecting member 13' have relatively small apertures therein adapted to receive fastening screws 14', passing through the sides of the casing to retain the rear plate in position when the device is ready for operation. A dial supporting plate 16' preferably of circular formation is carried by the horizontally extending portion 13 of the connecting member, and upon this support is mounted a dial 18', to be later described.

Journaled in the portion 13 of the connecting member is a pointer shaft 17, which passes through the dial supporting plate 16', as well as the dial 18' and carries at its outer end the ordinary pointer 19', movable over the dial bearing scales to indicate the position of the vehicle. The inner end of the shaft 17 is journaled in a bracket 19 of a substantially Z-shape formation, and having a relatively long supporting base 20 which is attached to the bar 13 in any suitable manner, a fastening screw being shown for the purpose of illustration. A stop 21 is arranged on the pointer shaft to prevent any movement of this shaft away from the bracket 19, while the movement of the shaft toward the bracket is, of course prevented as the pointer shaft is mounted within a bearing in the bracket. A pinion 22 is rigidly attached to the pointer shaft intermediate its ends and meshes at all times with a gear segment 23 mounted on the periphery of a carrying member 24, which is fixed on the main shaft 25. This gear segment 23 extends only a portion of the way around the periphery of the carrying wheel 24 and its teeth are arranged on one side of the segment and mesh at all times with the pinion. The segment is preferably of considerable width so that the carrying wheel may be spaced a slight distance from the pointer shaft and the pinion carried thereon.

To provide a convenient and durable mounting for the main shaft 25, this shaft has both of its ends pointed or reduced in diameter and supported by the adjustable supporting screws 26, having cup-shaped ends into which the reduced portions of the main shaft loosely fit. The parallel parts 13' of the U-shaped connecting member have rigidly fitted thereto plates 27', which provide relatively wide supporting bases for the adjustable supporting screws 26, one screw passing through each of the parallel plates 13', as well as the reinforcing plates 27' attached thereto, so that these screws are amply supported and are adjustable toward or from each other in keeping with the wearing action of the pointed ends of the shaft. In this way it will be seen that by properly adjusting these supporting screws the main shaft will at all times be retained in its proper position and the life thereof is considerably lengthened, as it is obvious that when the reduced end portions wear away the positions of the adjustable supporting screws are changed to properly position the shaft.

Suspended intermediate the ends of the bearings are the weights 28, two being shown for illustration, but it is, of course, apparent that good results can be obtained with the use of but a single weight. These weights when the vehicle is occupying a level position are vertically disposed, but when the vehicle rises or falls these weights oscillate in a direction depending upon the position of the vehicle, and in turn rotate the main shaft 25, which through the gear connection with the pointer shaft impart a movement to the pointer so that the same is moved and indicates on the dial 18' the position of the vehicle. The dial 18' having two sets of scales extending circumferentially therearound, one indicating the rise and fall in feet for each one hundred feet traversed on a horizontal line, and the other, or inner scale, designating the rise or fall in degrees.

As a suitable means for preventing fluctuation movements of the pointer and at the same time allowing the pointer to have a gradual and steady movement during its course of travel a dash pot 31 is rigidly attached to the movable portion of the casing and is vertically disposed so that the liquid placed in the dash-pot is prevented from leaking therefrom. The dash-pot is closed at its upper end by a threaded cap 32, having a relatively wide slot 33 therein for the passage of the piston rod 34, passing therethrough and attached at its lower end to the piston 35 housed within the dash-pot. The dash-pot is, of course, filled with fluid and in order to allow the piston to have a reciprocating movement the same is provided along its periphery with a plurality of channels, the movement of the piston depending upon the consistency of the fluid within the dash-pot, it being obvious that the sizes and number of the channels in the face of the piston may be varied to meet with any conditions. Pivotally attached to the upper end of the piston rod 34 by means of a cross pin 36 is an outstanding arm 37 projecting at right angles to the main shaft but rigidly secured thereto to provide a connection between the main shaft 25 and the piston 35 so that any movement of this shaft is instantly transmitted to the piston, which reciprocates in the dash-pot and in this manner slight fluctuations of the pointer are prevented. The action of the pointer is at all times steady due to the retarding dashpot and cylinder, which, of course, controls the rapidity of the rotation of the shaft, the hand or pointer not being affected in any way by the vibrations of the car, or when the machine strikes slight obstacles, as the piston within the dash-pot is prevented from moving by the liquid therein, until there has been a substantial movement of the shaft, at which time the piston also travels within the dash-pot in a manner as above described.

The indicating dial over which the pointer traverses has two sets of scales thereon, starting from zero, each set extending circumferentially from a given point around the dial and one scale 27' indicating the rise or fall of the machine in per cent. for each hundred feet traversed on a horizontal line, while the other scale 28' indicates by degrees the rise or fall of the vehicle. The scales beginning from the arrow at the top of the dial and extending half the distance around the dial on one side indicate the upgrade of the vehicle, while the scales beginning at the arrow and extending in an opposite direction half way around the dial designate the amount of inclination or descent of the vehicle. The graduation marks or scales arranged on each side of the dial correspond with each other, and one is traversed by the pointer when the vehicle is ascending, while the pointer traverses the opposite side of the dial when the vehicle is descending. The present arrangement of the scale gives sufficient scope of grade reading, as no vehicle could climb a hundred per cent. grade, or forty-five degrees angle on account of loss of traction, although it might be possible to ascend grades near this angle, if not too long, and if the vehicle had considerable momentum.

Having thus described my invention the operation is as follows:

The supporting base is secured to the frame of the vehicle at a point where the same is clearly visible, and the indicator is so adjusted to have the pointer register with the zero mark arranged upon the dial, which indicates that the vehicle is occupying a level position, the weights 28 at this time being vertically disposed. Now if the automobile is ascending a grade the main shaft will be moved due to gravity and the pointer will travel around the dial on the side marked up and indicate upon the scale on the dial the degree and per cent. of inclination, while if the machine is descending the pointer will travel around the portion of the dial marked down and designate the degree and per cent. of descension.

While I have described the device as being applied to an automobile, for which it is particularly adapted, I wish it to be clearly understood that the same is applicable for use upon aeroplanes to indicate the angle of the machine in relation to level, and to prevent miscalculation in ascending and descending. In addition to these uses the device can be applied to ships, and in fact wherever a gradometer is needed.

What I claim is:

1. A device of the character described, comprising a casing, an indicating dial, a pointer movable over said dial, a shaft for supporting said pointer, a pinion on said shaft, a main shaft adjacent the pinion, a member carried by the main shaft and having an offset peripheral segment provided with teeth meshing with the pinion, and a weight supported in each side of the segment by the main shaft for imparting motion thereto.

2. An indicating device of the character described, comprising a casing, an indicating dial, a pointer movable over said dial, a shaft for supporting said pointer, a pinion on said shaft, a main shaft adjacent the pinion, a member having an offset segment at its end disposed upon one side of the shaft, the segment having teeth portions along its edges meshing with the pinion, and a weight supported on each side of the segment by the main shaft for imparting motion thereto, in combination with a dash-pot positioned directly in the rear of the pointer shaft, a piston in said dash-pot, and a connection between said piston and the shaft at its center for retarding the movement of the shaft.

3. An indicating device of the character described, comprising a casing and an indicating dial, a pointer movable over said dial, a shaft for supporting said pointer, a pinion on said shaft, a main shaft positioned adjacent the pinion, a toothed segment supported by the main shaft and extending parallel therewith a substantial distance and meshing with the pinion on the pointer shaft, and a weight carried by the main shaft for imparting motion thereto, a dash-pot disposed below the toothed segment, and to one side thereof a piston in said dash-pot, and a connection between the piston and the central portion of the main shaft for retarding the movement of the shaft.

4. A device of the character described comprising a casing, a dial, a connecting member attached to the rear portion of the casing, and consisting of spaced parallel bars and a horizontal portion, a pointer shaft supporting a pointer passing through said connecting member, and a dial supporting plate carried by the horizontal portion thereof, a bracket having a portion secured to said connecting member and constructed to form a bearing for one end of the pointer shaft, a pinion on said pointer shaft, a main shaft, supporting means for said main shaft, an offset operating segment meshing with the pinion on the pointer shaft carried by the main shaft, and weights suspended from the main shaft in each side of the segment to impart movement thereto.

5. A device of the character described, comprising a casing, a dial, a connecting member attached to the rear portion of the casing, a pointer shaft supporting a pointer passing through said connecting member and a dial supporting plate carried thereby, a bracket having a portion secured to said connecting member and constructed to form a bearing for one end of the pointer shaft, a pinion on said pointer shaft, a main shaft, supporting means for the main shaft, an operating segment meshing with the pinion on the pointer shaft carried by the main shaft, having an end portion extending parallel therewith, and weights suspended from the main shaft in each side of the segment to impart a movement thereto, in combination with a dash-pot disposed below the segment and between the weights, having a piston therein connected to the main shaft for retarding the movement thereof.

6. An indicating device of the character described, comprising a casing having a transparent face, a removable end portion for said casing, a dial supporting plate having a dial thereon disposed within the casing, a connecting member for securing the removable end portion with the dial supporting plate, a pointer shaft carrying a pointer movable over the dial, a pinion on said shaft, a main shaft, members passing through the connecting member adapted to receive the ends of the main shaft to support the same, a gear on said main shaft meshing with the pinion on the pointer shaft, and a weight suspended and adapted to oscillate for imparting a movement to the shaft, and a retarding means comprising a vertically disposed dash-pot secured to the removable end portion of the casing and having a positive connection with the shaft.

7. An indicating device of the character described, comprising a casing having a transparent face, a removable end for said casing, a dial supporting plate, having a dial thereon, a connecting member of substantially U-shape formation attached to the removable end portion of the casing and the dial supporting plate, a pointer shaft passing through said connecting portion and carrying at its outer end a pointer, a bearing of angular formation secured to the connecting member and receiving the inner end of the pointer shaft, a main shaft, adjusting screws having cup-shaped ends adapted to receive said main shaft, a gear carried by the main shaft and meshing with the pinion on the pointer shaft, and weights capable of an oscillating movement suspended from the main shaft near each end for imparting motion thereto.

8. An indicating device of the character described, comprising a casing having a transparent face, a removable end for said casing, a dial supporting plate having a dial thereon, a connecting member of substantially U-shape formation attached to the removable end portion of the casing and the dial supporting plate, a pointer shaft passing through said connecting portion and carrying at its outer end a pointer, a bearing of angular formation secured to the connecting member and receiving the inner end of the pointer shaft, a main shaft, adjusting screws having cup-shaped ends adapted to receive said main shaft, a gear carried by the main shaft and meshing with the pinion on the pointer shaft, and weights capable of an oscillating movement suspended from the main shaft for imparting motion thereto, a vertically disposed dash-pot carried by the removable end of the casing, a piston in said dash-pot channel arranged in said piston, a closure having a slot therein overlying the upper end of the dash-pot, a piston rod secured to the piston and passing through the opening in the closure, and an arm rigidly attached to the main shaft, pivotally secured to said piston rod for retarding the movement of the main shaft.

9. An indicating device of the character described, comprising a casing, a dial, a pointer movable over said dial, means for supporting the pointer, means for actuating the pointer comprising a movable member having a weight suspended thereon, a dashpot having fluid therein carried by the casing, a piston operable in said dash-pot, and a positive connection between said piston and movable member for retarding the movement of the dial to prevent any lost motion between the piston and the movable actuating member.

10. An indicating device of the character described, comprising a casing, a dial, a pointer movable thereover, means for supporting said pointer, a movable member having a driving connection with said pointer, a weight suspended from said movable member, a dash-pot arranged adjacent the movable member, a piston provided with curved side walls and having a channel passing therethrough mounted in said dash-pot, a piston rod connected to said piston, and means for positively connecting the piston rod with the movable weight supporting member for retarding the movement of the pointer.

In testimony whereof I hereunto affix my signature in the presence of two witnesses.

RUTHERFORD B. POTTER.

Witnesses:
ROBERT C. ALEXANDER,
E. B. MOORE.